Figure 1:
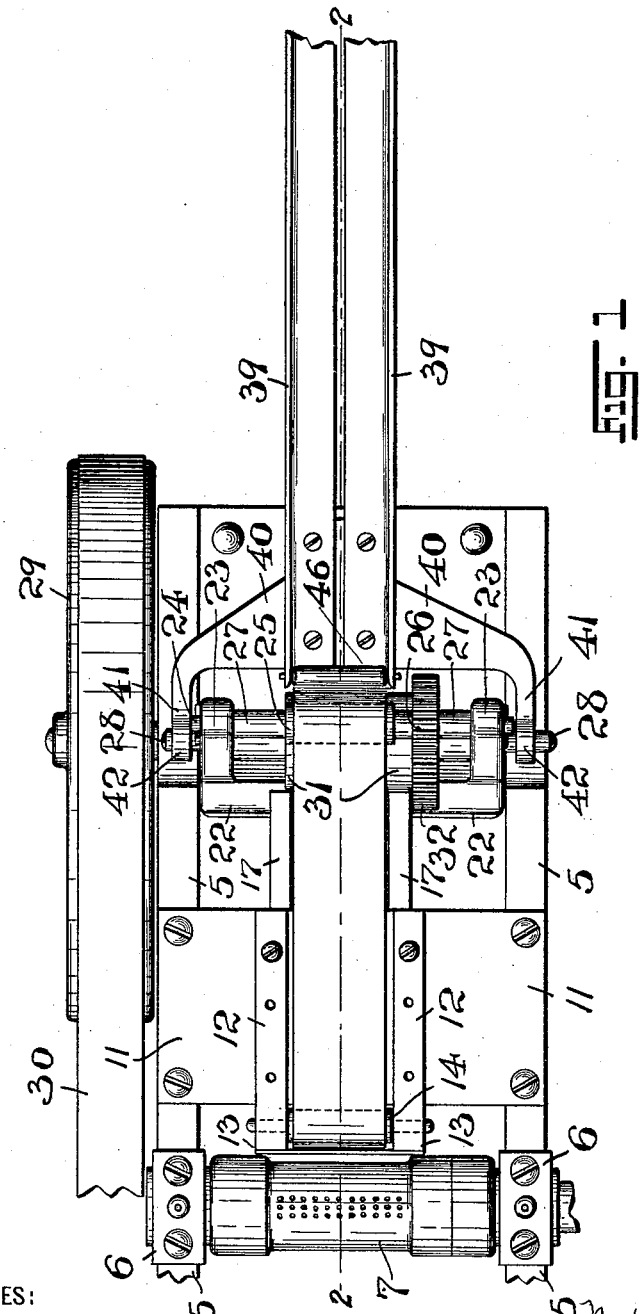

N. J. MATTHEWS, R. LE G. JOHNSTONE & A. W. CASH.
CONVEYER FOR WRAPPING AND LABELING MACHINES.
APPLICATION FILED NOV. 5, 1909.

1,024,012.

Patented Apr. 23, 1912.

3 SHEETS—SHEET 1.

WITNESSES:
Fredk H. W. Fraentzel
Anna H. Alter.

INVENTORS:
Nate J. Matthews,
Robert Le Grand Johnstone,
Arthur W. Cash,
BY
Fraentzel and Richards,
ATTORNEYS N. J. MATTHEWS, R. LE G. JOHNSTONE & A. W. CASH.
CONVEYER FOR WRAPPING AND LABELING MACHINES.
APPLICATION FILED NOV. 5, 1909.

1,024,012.

Patented Apr. 23, 1912.

3 SHEETS—SHEET 2.

N. J. MATTHEWS, R. LE G. JOHNSTONE & A. W. CASH.
CONVEYER FOR WRAPPING AND LABELING MACHINES.
APPLICATION FILED NOV. 5, 1909.

1,024,012.

Patented Apr. 23, 1912.

3 SHEETS—SHEET 3.

UNITED STATES PATENT OFFICE.

NATE J. MATTHEWS, OF NEWARK, ROBERT LE GRAND JOHNSTONE, OF GLEN RIDGE, AND ARTHUR W. CASH, OF NEWARK, NEW JERSEY.

CONVEYER FOR WRAPPING AND LABELING MACHINES.

1,024,012.      Specification of Letters Patent.      Patented Apr. 23, 1912.

Application filed November 5, 1909. Serial No. 526,342.

*To all whom it may concern:*

Be it known that we, NATE J. MATTHEWS, ROBERT LE GRAND JOHNSTONE, and ARTHUR W. CASH, citizens of the United States, residing, respectively, at Newark, in the county of Essex and State of New Jersey; Glen Ridge, county of Essex, and State of New Jersey, and Newark, county of Essex, and State of New Jersey, have invented certain new and useful Improvements in Conveyers for Wrapping and Labeling Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in automatic conveyers for wrapping and labeling machines; and, this invention relates, more particularly, to an improvement in that class of wrapping machines, such as are disclosed in previous applications for Letters-Patent filed, respectively, by Nate J. Matthews, January 28th, 1909, Serial Number 474,699, and by Nate J. Matthews, Robert Le Grand Johnstone and Arthur W. Cash, as joint inventors, July 30th, 1909, Serial Number 510,426.

The principal object of the present invention is to provide a novel construction of conveyer-device for said wrapping and labeling machines adapted to receive the wrapped and labeled articles from the wrapping and labeling elements of the machine to convey the same to a receiving chute, from which they may be removed for packing in boxes, or for other disposal.

A further object of the present invention is to provide in connection with said conveyer-devices a novel means for driving the same, together with means for adjusting or tightening the conveyer-belts which form a part of said conveyer-devices.

Other objects of the present invention not at this time more particularly mentioned will be clearly understood from the following detailed description of the said invention.

The invention is clearly illustrated in the accompanying drawings, in which:—

Figure 2:
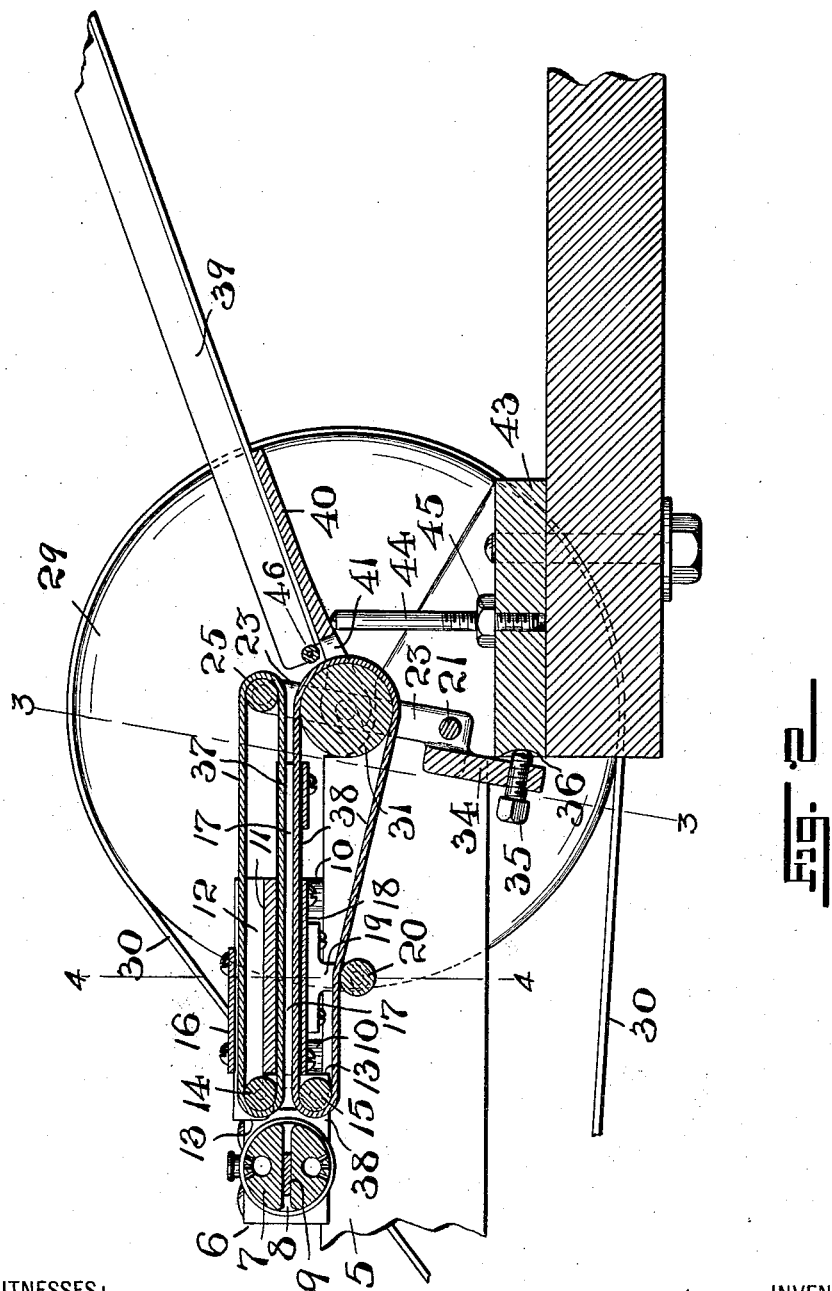
Figure 3:
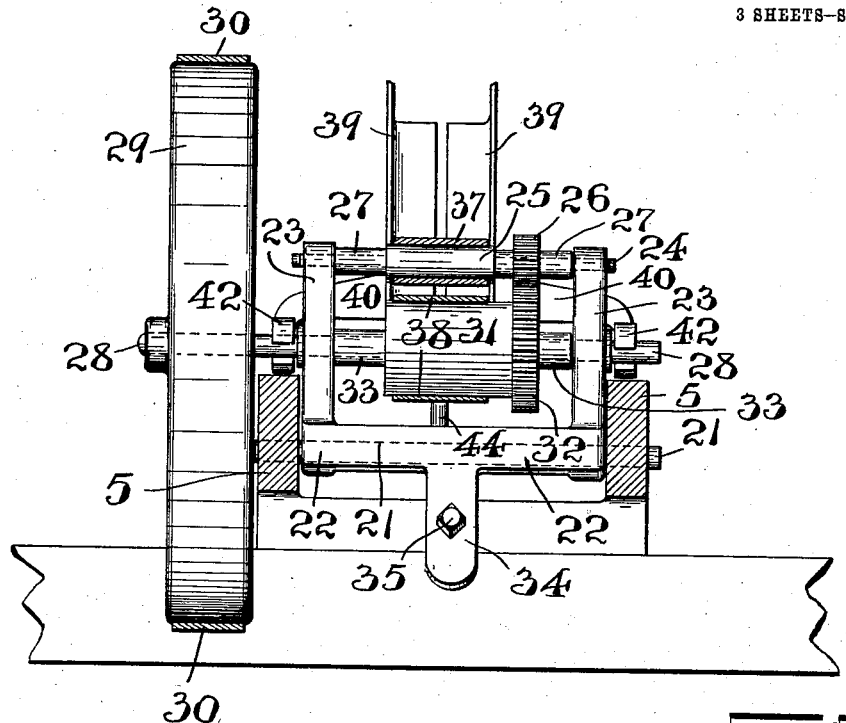
Figure 4:
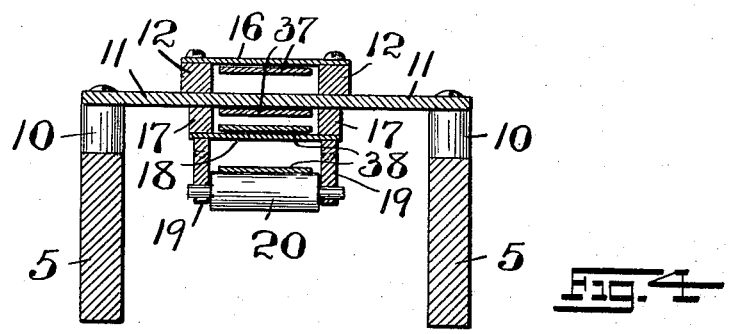

Figure 1 is a detail plan view of that portion of the wrapping and labeling machine with which the novel conveyer-devices, embodying the principles of our present invention, are connected. Fig. 2 is a longitudinal vertical section, taken on line 2—2 in said Fig. 1; Fig. 3 is a transverse section, taken on line 3—3 in said Fig. 2, and Fig. 4 is a detail transverse section, taken on line 4—4 in said Fig. 2.

Similar characters of reference are employed in all of the above described views, to indicate corresponding parts.

Referring now to the several figures of the drawings, the reference-character 5 indicates the framework of the wrapping machine in which are mounted the various operating devices and parts of said machine. Mounted in suitable bearings 6, which are suitably connected with said frame-work 5, is one of the wrapping-rollers, in this case the last or label-roll 7, the same being provided with the transverse opening or slot 8 in which is slidably arranged the push-device or element 9. Elevated and secured upon studs 10, which are suitably disposed upon and secured to the frame-work 5, is a horizontal plate or platform 11, upon the upper surface of which are arranged and secured a pair of longitudinally extending guide-members 12. The ends of said guide-members 12, adjacent to said label-roll 7, are provided with downwardly extending portions 13, and journaled in the upper portions of said downwardly extending portions 13 is an idler-roller 14. In a like manner, journaled in the lower portion of said downwardly extending portions 13, is another idler-roller 15. The said idler-rollers 14 and 15 are respectively just above and below the mouth of the opening or slot 8 in said label-roll 7, when said opening or slot is in its horizontal position ready for the delivery of a wrapped and labeled article. Secured in any suitable manner, so as to extend across the top surfaces of said guide-members 12, is a top-plate 16. Secured upon the under surface of said plate or platform 11 are a second pair of guide-members 17, and secured in any suitable manner, so as to extend across the under surfaces of said guide-members 17, is a bottom-plate 18. Secured to the under surface of said bottom-plate 18, in any suitable manner and in the proper location, are a pair of bearing-brackets 19, and journaled in said bearing-brackets 19 is an idler-roller 20. Mounted in said frame-work 5 of said wrapping and labeling machine is a transverse shaft 21, and pivotally mounted upon said transverse shaft 21 is a frame-member 22 which is provided at each end adjacent to the inner sides of the frame-work 5 with a pair of upwardly extending arms 23. Journaled in the upper end of said arms 23 is a shaft 24 upon which is secured a driving roller 25. Said shaft 24 is further provided with a gear-wheel 26 secured thereto. Suitable collars 27 are arranged upon said shaft 24 to retain the driving-roller 25 in proper alinement. In like manner, there is journaled between said arms 23, at a point below the shaft 24, a driving shaft 28, said shaft 28 projecting outwardly at one end beyond the frame-work 5 and having secured thereto a pulley-wheel 29 which is connected by means of a belt 30 to the main driving shaft of the wrapping and labeling machine. Secured upon said driving shaft 28 is a driving pulley 31, adjacent to one end of which is a gear-wheel 32 which meshes with a gear-wheel 26 secured upon said shaft 24. Suitable collars 33 are arranged upon said driving shaft 28 to retain said driving-roller in proper alinement. Formed integrally with said frame-member 22 and extending downwardly therefrom is a tongue or lug 34 in the free end of which is arranged a set-screw 35, the end of which bears against a suitable seat 36 formed in a portion of the frame-work 5 of said wrapping and labeling machine. Extending from the driving-roller 25 and around the idler-roller 14 is an endless belt 37, the lower side of which passes between the guide-members 17 and directly beneath the under surface of said plate or platform 11; and the upper side of which passes between the guide-members 12 and above the said plate or platform 11. In like manner, extending from the driving pulley 31 and around the idler-roller 15 is an endless belt 38, the upper side of which passes between the guide-members 17 directly above the bottom-plate 18, and the lower side of which passes beneath said bottom-plate 18 and over the idler-roller 20. Arranged at the discharge end of said endless belts 37 and 38 is a receiving-chute 39, the same being supported by a yoke-member 40 which is secured thereto, said member being provided with a pair of straddler-arms 41, which are formed at their free ends with forked-members 42 which operatively engage the driving shaft 28, substantially as shown. As a further means for properly supporting said chute 39, there is secured in the base-member 43 of said frame-work 5 a stud-screw 44, the free end of which is in supporting engagement with the yoke-member 40 of said receiving-chute 39, said stud-screw being locked in a proper adjusted position by means of the nut 45.

The operation of the conveyer-devices, the construction of which has above been set forth in detail, is very simple. The driving-pulley 29 imparts motion to the driving shaft 28 and driving-roller 31 which causes the proper operation of the endless belt 38, and the gear-wheel 32 transmits its motion to the gear-wheel 26, shaft 24 and driving-roller 25, whereby the belt 37 is properly operated. As the wrapped and labeled article is discharged from the slot 8 of said label-roll 7 it is received between the moving belts 37 and 38. The belts 37 and 38 keep the freshly gummed label and wrapper in place as the article is squeezed therebetween, so that while the said belts convey the articles on toward the receiving-chutes sufficient time elapses to allow the gummed label and wrapper to dry securely in place. Eventually the wrapped and labeled article passes through the discharge-end of said belts 37 and 38 and into said receiving-chute 39. Said receiving-chute 39 is further provided at its receiving end with a suitably mounted idler-roller 46, the same serving to facilitate the movement of the wrapped article into the chute as it passes from the discharge end of the moving belts. The said idler-roller 46 reduces the friction, and also prevents a wrapped article from catching or tripping before the same is finally deposited in proper position flat upon the floor of said receiving-chute.

The belts 37 and 38 are kept in a proper condition of tautness by the operation of the set-screw 35 which, bearing against the base-member 43, pushes the tongue or lug 34 outwardly and carries forward the upwardly extending arms 23 of said frame-member 22 which is pivotally mounted upon said shaft 21. The outward movement of said arms 23 carries with them the driving-roller 31 and driving-roller 25 thus exerting a tightening pressure upon said belts 37 and 38. The said receiving chute 39 being supported by said yoke-member 40, which by means of its straddler-arms 41 and forked members 42 engages the shaft 28, is therefore maintained at a constant proper receiving relation to the discharge end of the said endless-belts which form the conveyer. This pivotal connection between the said receiving-chute 39 and the shaft 28 permits of the adjustment of the tension of said endless belts through the movement of said frame-member 22, as above described, without disturbing the receiving relation of said receiving-chute thereto, since the same will move in correspondence with the movement of said shaft 28 as controlled by the movement of said frame-member 22.

We are aware that changes may be made in the general arrangements and combinations of the various devices and parts, as well as in the details of the construction of the same, without departing from the scope of our present invention as set forth in the foregoing specification and as defined in the appended claims. Hence, we do not limit our invention to the exact arrangements and combinations of the devices and parts as described in the said specification, nor do we confine ourselves to the exact details of the construction of the said parts as illustrated in the accompanying drawings.

We claim:—

1. In conveyer-devices for wrapping and labeling machines, the combination with a platform of a pair of guide-members upon the upper surface of said platform, downwardly extending portions connected with the forward ends of said guide-members, idler-rollers journaled in said downwardly extending portions, a second pair of guide-members upon the lower surface of said platform, a pair of endless belts superimposed one above the other between said pairs of guide-members, and means for supporting and driving said endless belts, comprising a pivotally mounted frame-member, a driving-shaft journaled in said frame-member, a driving pulley secured upon said driving shaft, a driving-roller secured upon said driving shaft, adapted to drive one of said endless belts, a gear-wheel connected with said driving shaft, a second shaft journaled in said frame-member, a driving-roller secured thereon, said driving-roller being adapted to drive the other of said endless belts, and a gear-wheel secured on said second shaft and in mesh with said first-mentioned gear-wheel.

2. In conveyer-devices for wrapping and labeling machines, the combination with a platform of a pair of guide-members upon the upper surface of said platform, downwardly extending portions connected with the forward ends of said guide-members, idler-rollers journaled in said downwardly extending portions, a second pair of guide-members upon the lower surface of said platform, a pair of endless belts superimposed one above the other between said pairs of guide-members, and means for supporting and driving said endless belts, comprising a pivotally mounted frame-member, a driving-shaft journaled in said frame-member, a driving pulley secured upon said driving shaft adapted to drive one of said endless belts, a gear-wheel connected with said driving shaft, a second shaft journaled in said frame-member, a driving-roller secured thereon, said driving-roller being adapted to drive the other of said endless belts, a gear-wheel secured on said second shaft and in mesh with said first-mentioned gear-wheel, and means for regulating the tension of said endless belts, comprising a tongue or lug extending downwardly from said frame-member, and an adjusting set-screw connected therewith, by means of which said frame-member may be moved on its fulcrum, substantially as and for the purposes set forth.

3. In conveyer-devices for wrapping and labeling machines, the combination with a platform of guide-members connected with said platform, a pair of endless belts superimposed one above the other between said guide-members, means for supporting and driving said endless belts, comprising a system of idler-rollers, a pivotally mounted frame-member, shafts journaled in said frame-member, a driving-pulley secured upon one of said shafts, driving-rollers mounted upon said shafts, intermeshing gear-wheels mounted on said shafts, and means for regulating the tension of said endless-belts, comprising a tongue or lug extending downwardly from said frame-member, and an adjusting set-screw connected therewith, by means of which said frame-member may be moved on its fulcrum, substantially as and for the purposes set forth.

In testimony, that we claim the invention set forth above we have hereunto set our hands this 22nd day of October, 1909.

NATE J. MATTHEWS.
ROBERT LE GRAND JOHNSTONE.
ARTHUR W. CASH.

Witnesses:
FREDK. C. FRAENTZEL,
FREDK. H. W. FRAENTZEL.

Copies of this patent may be obtained for five cents each, by addressing the "Commissioner of Patents, Washington, D. C."